United States Patent [19]

Grove

[11] 4,236,861
[45] Dec. 2, 1980

[54] SCISSORS LIFT WITH PIPE HANDLER

[75] Inventor: John L. Grove, Greencastle, Pa.

[73] Assignee: JLG Industries, Inc., McConnellsburg, Pa.

[21] Appl. No.: 945,325

[22] Filed: Sep. 25, 1978

[51] Int. Cl.³ .................................. B66F 11/04
[52] U.S. Cl. .................................. 414/540; 414/546; 414/495; 414/680; 182/141
[58] Field of Search .............. 414/471, 495, 501, 508, 414/544, 546, 659, 660, 745, 718, 540, 680; 280/638, 35, 37; 182/2, 129, 141; 187/8.43

[56] References Cited

U.S. PATENT DOCUMENTS

| 2,617,547 | 11/1952 | Pridy | 414/495 X |
| 2,676,715 | 4/1954 | Pridy | 414/546 |
| 2,704,160 | 3/1955 | Arvidsson | 414/546 |
| 2,762,659 | 9/1956 | Harlan | 182/141 |
| 2,787,278 | 4/1957 | Mitchell | 182/2 X |
| 2,789,707 | 4/1957 | Wolf | 414/546 X |
| 2,797,833 | 7/1957 | Cash, Jr. | 414/495 |
| 3,018,842 | 1/1962 | Abrell | 182/129 |
| 3,021,021 | 2/1962 | Warren | 414/546 |
| 3,103,291 | 9/1963 | Cresci | 414/495 |
| 3,165,214 | 1/1965 | Young | 414/546 |
| 3,643,825 | 2/1972 | Zane, Jr. | 414/607 |
| 3,667,621 | 6/1972 | Barlow | 414/680 |
| 3,809,180 | 5/1974 | Grove | 182/2 |
| 3,937,340 | 2/1976 | Grove | 182/2 X |
| 4,162,873 | 7/1979 | Smith, Jr. | 414/718 X |

FOREIGN PATENT DOCUMENTS 587438  1/1978  U.S.S.R. .................................. 355/29

Primary Examiner—Stephen G. Kunin
Assistant Examiner—Terrance L. Siemens
Attorney, Agent, or Firm—Irvin A. Lavine

[57] ABSTRACT

A vehicle has a mobile, self-propelled chassis with a platform extendable upwardly by a motor and scissors linkage. A lever is pivotally connected to the chassis and has pipe grabs on the free end; the lever is raised to deposit a pipe on rails on the platform. A vertical hydraulic motor on the platform has saddles for lifting a pipe from the rail to a higher elevation.

24 Claims, 5 Drawing Figures

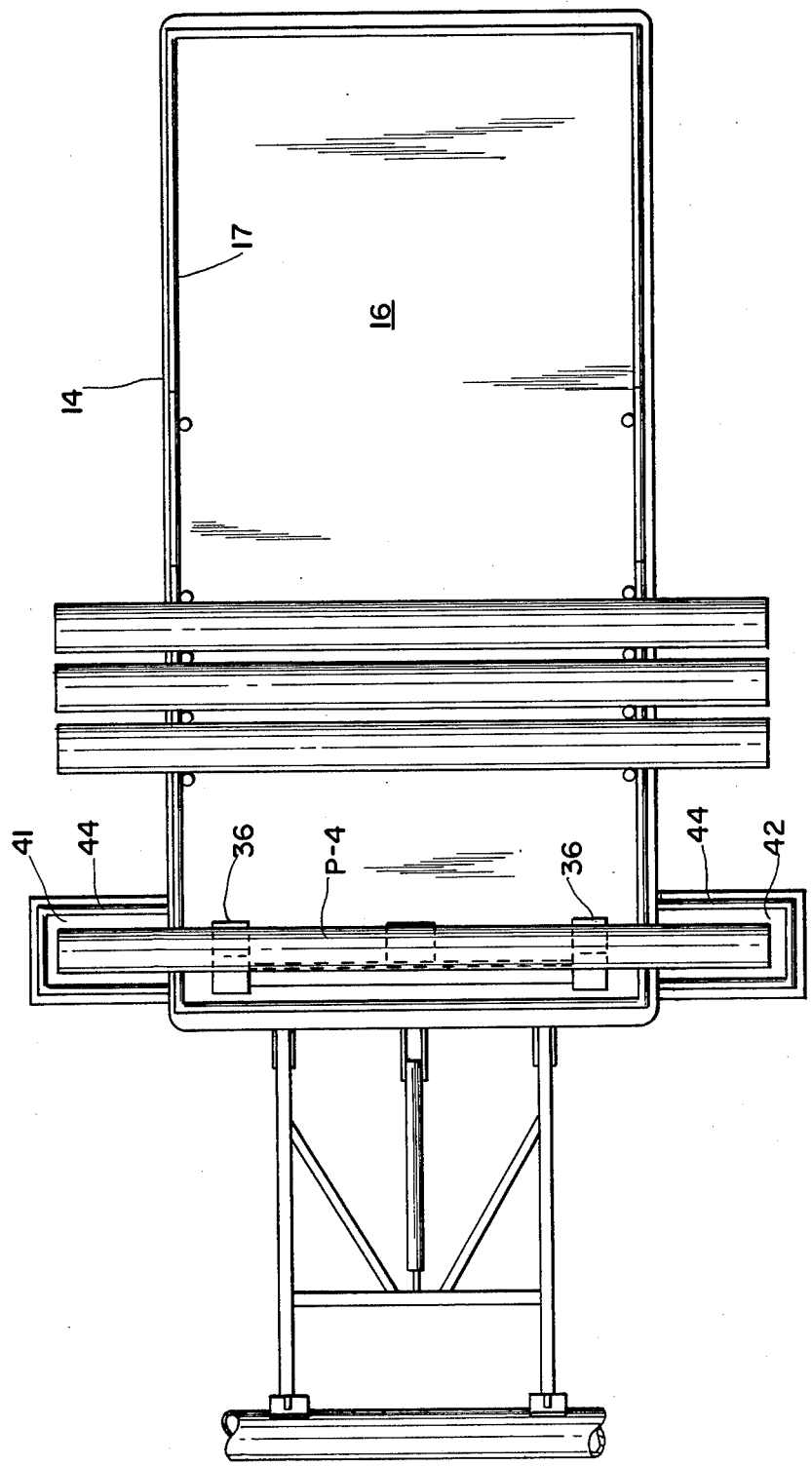

SCISSORS LIFT WITH PIPE HANDLER

BACKGROUND OF THE INVENTION

The present apparatus is a scissors lift vehicle equipped with pipe handling apparatus.

It is often desirable to install pipes at an elevated location above the ground, such as sprinkler pipes just beneath the roof of a building, or at a substantial height above the floor of the building. These operations require that the pipe be lifted and placed in position and, also, that plural pipes be joined together, and this must be done by workmen who are able to have access to the ends of the pipe, or to the pipe joint structure, to effect assembly thereof.

There have been proposed the addition to aerial platform apparatus of pipe grabs or pipe handling apparatus. Aerial platform apparatus may be described as a self-propelled vehicle having a chassis with a rotatable upper works, and an extensible boom pivoted on the upper works. A workman's platform or basket is carried adjacent the outer end of the boom, and there have been proposed the addition of pipe grabs or pipe handling implements to such aerial platform apparatus. These machines were capable of grabbing a pipe at or adjacent the ground, while a workman was in the workmans's platform or basket, and then elevating the platform, together with the pipe, and finally the pipe could be elevated to a position above the platform. As will be readily understood, such apparatus could only handle a single pipe at a time. Examples of the foregoing constructions are GROVE U.S. Pat. No. 3,809,180 and GROVE U.S. Pat. No. 3,937,340.

Apparatus in which there is a self-propelled vehicle with an extensible boom and a workman's platform, and a storage apparatus for tubular articles is also known. See MITCHELL U.S. Pat. No. 2,787,278.

A number of proposals have been made for loading tubular objects, such as logs, pipes and telephone poles onto the bed of a flat-bed truck, these apparatus utilizing pivoted levers which are capable of engaging the tubular articles with their outer ends, and, upon rotation of the levers, swinging the articles upwardly from a position at or near the ground, so as to deposit them onto the bed of a truck. Examples of such constructions are ARVIDSSON, U.S. Pat. No. 2,704,160, WOLF, U.S. Pat. No. 2,789,707, WARREN, U.S. Pat. No. 3,021,021 and BARLOW, U.S. Pat. No. 3,667,621. In these devices, the tubular article loaded onto the truck is removed therefrom by effecting a rotation of the arms from a substantially vertical position in which their free ends are uppermost, to a position in which their free ends are at or adjacent ground level, but there is no elevation of the tubular articles from their position on the truck to a higher position.

Arms have also been applied to a vehicle to load other apparatus onto the vehicle, such as a reel of cable. See YOUNG, U.S. Pat. No. 3,165,214.

In addition, the prior art has been aware of scaffolds having material handling apparatus attached to them, for elevating objects, examples being HARLAN et al, U.S. Pat. No. 2,762,659 and ABRELL, U.S. Pat. No. 3,018,842.

SUMMARY OF THE INVENTION

The present invention is directed to a vehicle, preferably of the scissors linkage type, which has a workman's platform movable between a lower and an upper position, and to which vehicle there are attached first and second pipe lifting apparatus. The first pipe lifting apparatus includes a lever pivoted to the chassis, having pipe engaging elements at the free end, and capable of raising a pipe to the platform when the platform is in the lower position; in particular, the platform is equipped with a rail and the pipe is deposited on the rail, which serves to store a plurality of the pipes. The platform is equipped with a hydraulic cylinder which extends vertically, and has a piston rod with a cross-arm on its upper end, the cross-arm being provided with saddles for engaging a pipe. These saddles are movable from a position below the level of the pipe to a substantially elevated position, so as to raise the pipes substantially above the level of the rails of the platform. In addition, the saddles may be supported by screw jacks on the ends of the arm. In one embodiment, the hydraulic cylinder is mounted at the middle of the platform, and the cross-arm carried by the piston rod of the hydraulic cylinder is rotatable through at least 90°, so as to position the pipe in different angular relationships to the platform. In another embodiment, the hydraulic cylinder is positioned at one end of the platform, and the platform is provided with extension wings to enable workmen to stand thereon and join one pipe to another.

Among the objects of the present invention are the provision of a vehicle having an elevatable platform, and which is capable of first lifting a number of pipes onto the platform, and then, after elevation of the platform, to lift one pipe at a time to a position substantially above the platform.

Another object of the present invention is to provide an apparatus of the foregoing type which enables the handling of a plurality of pipes and their expeditious placement and assembly.

Other objects and many attendant advantages of the present invention will be readily understood from the following specification and claims.

BRIEF DESCRIPTION OF THE DRAWING

FIG. 5 is a plan view of FIG. 4.

DESCRIPTION OF THE PREFERRED EMBODIMENTS

Figure 1:
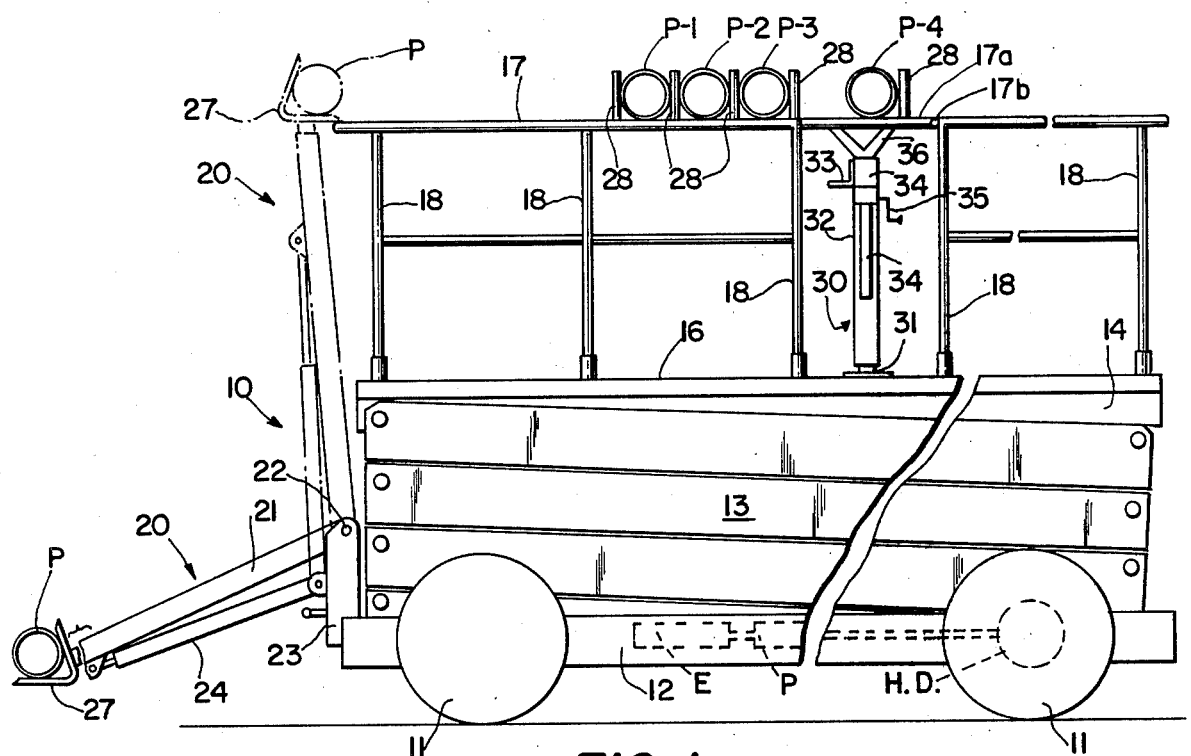
FIG. 1 is a side elevation with parts broken away, of a scissors lift apparatus with pipe handlers, in accordance with the present invention.
Figure 2:
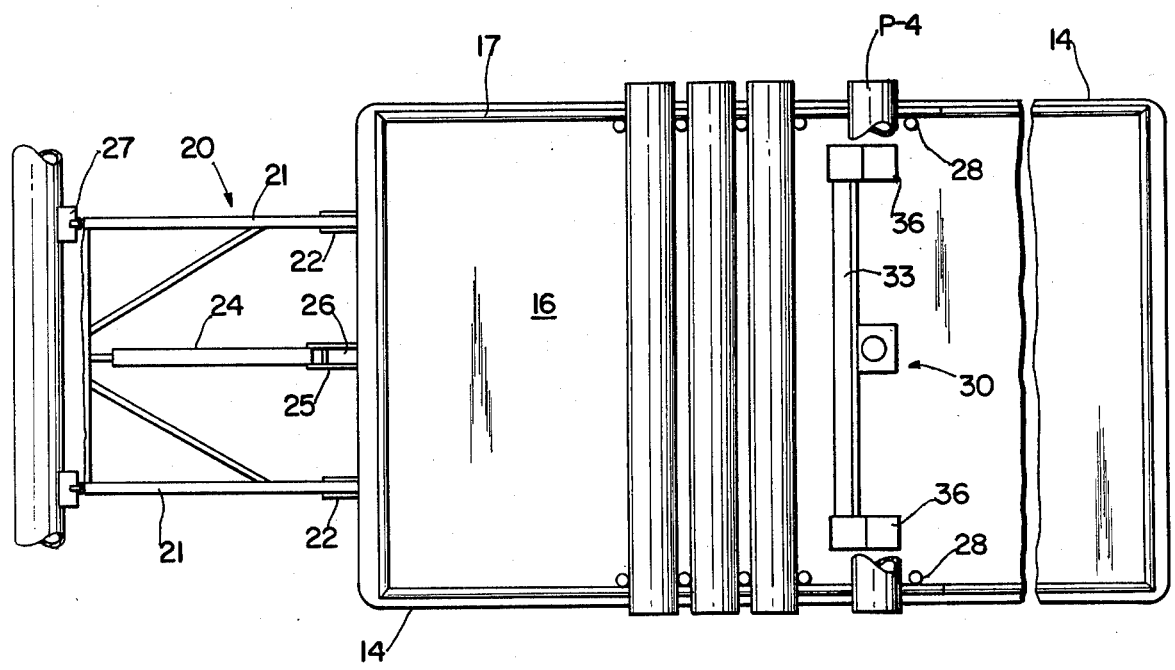
FIG. 2 is a top plan view, with parts broken away, of the apparatus of FIG. 1.

Referring now to the drawing, wherein like or corresponding reference numerals are used to designate like or corresponding parts throughout the several views, there is shown in FIG. 1 a scissors lift vehicle generally designated 10, and including wheels 11 mounted on and supporting the chassis 12. As is conventional, the vehicle 10 is self-propelled, as by a gasoline engine or electric motor, and is also steerable. FIG. 1 shows, schematically, an engine E driving a pump P which supplies fluid under pressure to hydrostatic drive units H.D. for driving two aligned wheels 11. Mounted on the chassis 12 is the scissors linkage 13, comprising, in conventional manner, crossed links which are pivotably connected at their ends and at their midpoints. The scissors linkage 13 supports a platform 14, having a floor 16 and rails 17 supported by generally vertically extending posts 18. As is shown in FIG. 2, the platform 14 is generally rectangular in plan form, and the rail 17 extends peripherally about the floor 16. A control panel (not shown) is mounted on the platform 14, and is preferably supported by the rail 17.

In order to lift pipes from a level at or adjacent the floor on which the vehicle 10 moves, and for depositing the pipe on the platform, there is provided a pipe engaging and lifting apparatus 20, which includes a pair of levers 21 pivoted at 22 about a horizontal axis to the posts 23, which latter are supported at one end of the chassis 12. A hydraulic cylinder 24 is pivoted at 25 to a bracket 26 extending from the chassis 12, between the posts 23. Thus, the hydraulic cylinder 24 lies between levers 21.

At their outer ends, the levers 21 carry angular pipe engaging elements 27, and a pipe P is shown positioned in and carried by the elements 27, and hence by the entire apparatus 20.

Referring to FIG. 1, the pipe engaging and lifting apparatus 20 is shown in elevated position to which it is moved by extension of the hydraulic cylinder 24, which extension causes the levers 21 to rotate about the pivot 22. As is clearly shown in FIG. 1, the pipe engaging element 27 has a portion thereof which is substantially horizontal, and due to the length of the levers 21 and the height of post 23, in relation to the position of the rail 17, when the linkage 13 is in the collapsed or retracted state, as shown in FIG. 1, the pipe P will thereby be enabled to be deposited directly onto the platform 14, and more particularly, onto the rail 17 thereof. As will be understood, the rail 17 serves to store a plurality of pipes, such as pipes P-1 . . . P-4, when successively elevated to and deposited on the rail 17. As shown in FIG. 2, the pipes are positioned so as to extend transversely of the longitudinal axis of platform 14, and may be held in desired positions by detents 28. The detents 28 may comprise sockets secured to the rail, and pins extending into the sockets, and removable therefrom, when desired. The detents 28 extend above the rails, and upon removing them in a desired manner, a pipe such as P-4 may be moved into position to be lifted (as hereinafter described) and, sequentially, P-3, P-2 and P-1 moved into the noted position. While five pipes have been shown, this is illustrative only, the number depending upon such factors as the weight of each pipe, and the lifting capacity of the vehicle 10.

Adjacent the center of the platform 14 in the longitudinal direction, the rail 17 is provided with a gate portion 17a which is hinged at 17b, and which is provided with a detent 28 upstanding therefrom. The section of rail 17a may be pivoted upwardly, so as to permit access to the platform 14 by a workman or workmen.

A second engaging and lifting apparatus is provided on the vehicle 10, being designated 30; the apparatus 30 comprises a substantially vertically extending hydraulic cylinder 31 having an upwardly extensible portion 32, and supported on the floor 16 of the platform 14 substantially at the center thereof, both longitudinally and laterally. The movable portion 32 of the hydraulic cylinder 31 carries a cross-arm 33 at its upper end, cross-end 33 being substantially horizontal, and having at the ends thereof a pair of screw jacks 34, each provided with a handle 35. The screw jack 34 is of known construction, and comprises a screw threaded rod or a rack, which is caused to be raised and lowered by manipulation of the handle 35. Each screw jack at its upper end carries a saddle 36. Each saddle 36 is generally upwardly facing, and in the lowest position thereof, shown in FIG. 1, it is below the pipe storing rail 17. In this lowest position, the hydraulic cylinder 31 is fully retracted and the screw jacks have placed the saddles 36 at their lowest position relative to the cross-arm 33. The screw jacks 34 may be seen in FIGS. 1 and 3, but are hidden in FIG. 2 by the saddles 36.

As seen in FIGS. 1 and 2 the cross-arm 33 is positioned transversely of the platform 14, and lies directly beneath the pipe P-4. The pipe P-4 is maintained in position by the detent 28 carried on the section 17a of the rail.

Figure 3:
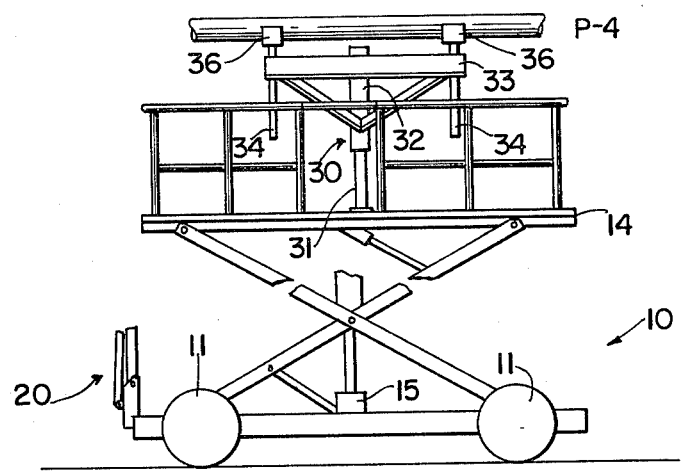
FIG. 3 is a side elevational view of the apparatus of FIG. 1, with parts broken away, in extended or elevated position.

In operation, the apparatus 20 is used to load a number of pipes onto the rail 17 for storage. After the desired number of pipes have been loaded on the rail 17, the scissors linkage 13 is extended, as shown in FIG. 3, so as to raise the platform 14 to an elevated position. Such extension of scissors lifts is well known, and may be accomplished by a hydraulic cylinder 15. As shown in FIG. 3, after elevation of platform 14, the lifting apparatus 30 may be actuated, the arm 33 initially having the position shown in FIGS. 1 and 2, and thereby effecting engagement of the pipe P-4 by the saddles 36 and the subsequent elevation thereof. The upper part 32 of hydraulic motor or cylinder 31 being rotatable at least through 90°, the cross-arm 33 and the pipe P-4 may be caused to rotate, so as to be perpendicular to the position shown in FIGS. 1 and 2. In this way, the workmen may have access to the ends of the pipe P-4, so as to couple it to an adjacent pipe, while it is supported by the vehicle 10. As will be understood the screw jacks 34 may be utilized to raise the saddles 36, to either the same level or different levels, to effect, selectively, inclination of the pipe P-4 and the provision of additional height to it.

Figure 4:
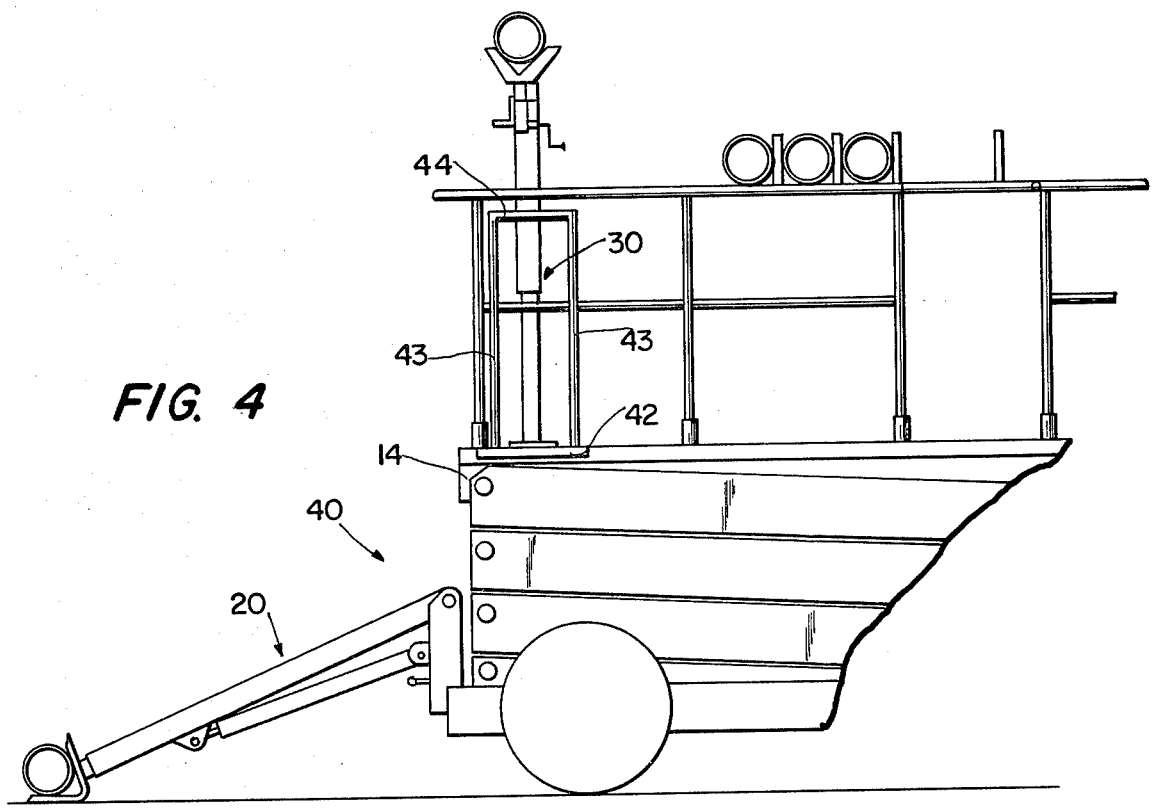
FIG. 4 is an elevational side view, with parts broken away, of another embodiment of the present invention.

Referring now to FIGS. 4 and 5, there is shown a vehicle 40 which differs from the vehicle 10 in that the engaging and lifting apparatus 30 is placed adjacent to one end of the platform 14. The cross-arm 33 (See FIG. 5) lies transversely of the longitudinal axis of the platform 14, and the platform 14 is provided with extension wings 41 and 42, so as to provide for access by the workmen to the ends of the pipe P-4 carried by the saddles 36. These extensions are provided with suitable upstanding posts 43 and rails 44, to provide for the safety of the workmen.

There has been provided a scissors lift apparatus with pipe handlers, so that a self-propelled vehicle may lift cylindrical articles or objects, such as pipes, and place them on a storage portion. The scissors lift apparatus may then be extended, and second pipe engaging apparatus, mounted on the platform, is then raised, so as to elevate a pipe above the level of the storage means, being specifically the rail of the platform. In this way, an efficient operation may be carried out, whereby a number of pipes may be loaded by the vehicle, without assistance from any other apparatus, and a plurality of pipes may be placed in position without raising and lowering the platform after each pipe is placed in position.

It will be obvious to those skilled in the art that various changes may be made without departing from the spirit of the invention and therefore the invention is not limited to what is shown in the drawings and described in the specification but only as indicated in the appended claims.

I claim:
1. In combination,
a vehicle including a chassis, ground engaging means including drive means for supporting and moving the chassis, a workman's platform having a floor and means for supporting said workman's platform from said chassis at selected heights relative to said chassis, first article engaging and lifting means on said vehicle for engaging an article substantially at ground level, for lifting said article to an elevated position at least as high as the platform, and for depositing said article on the platform, means on said platform for storing a plurality of articles deposited thereon, and second article engaging and lifting means on said platform for engaging an article thereon and for lifting said article to an elevation above said storing means.

2. The combination of claim 1, wherein said means for supporting said workman's platform comprises scissors linkage.

3. The combination of claim 1, wherein said first mentioned article engaging and lifting means comprises lever means pivotally connected to said chassis.

4. The combination of claim 3, said first mentioned article engaging means being supported by said lever means remote from said chassis, said first mentioned article engaging means being at substantially the same level as said storing means in the elevated position of said first mentioned article engaging and lifting means.

5. The combination of claim 4, said storing means comprising rails at the periphery of said platform.

6. The combination of claim 5, and detent means extending above said rails.

7. The combination of claim 1, said storing means comprising means for supporting articles at a level above the floor of said platform.

8. The combination of claim 7, said storing means comprising rails at the periphery of said platform.

9. The combination of claim 1, said storing means being above the level of the floor of the platform, the first mentioned article engaging and lifting means comprising lever means pivotally connected to said chassis and having article engaging means remote from said chassis and located at substantially the same level as said storing means in the elevated position of said first mentioned article engaging and lifting means.

10. The combination of claim 1, said last mentioned means comprising a fluid cylinder.

11. The combination of claim 10, said fluid cylinder comprising means for moving said article engaging means from a first position at or below an article deposited on said article storing means to a second position thereabove.

12. The combination of claim 1, said last mentioned means comprising a fluid cylinder, a substantially horizontal arm carried by said fluid cylinder for movement vertically, said article engaging means carried by said arm.

13. The combination of claim 12, said article engaging means comprising an upwardly facing saddle at each end of the arm for supporting a cylindrical object.

14. The combination of claim 13, and vertically adjustable means supporting said saddles on said arm.

15. The combination of claim 13, and a jack supporting each said saddle on said arm.

16. The combination of claim 1, said last mentioned means being adjacent the center of the workman's platform.

17. The combination of claim 16, said last mentioned means comprising a fluid cylinder and a horizontal arm carried thereby, and means for journalling said arm for rotation in a horizontal plane through at least 90°.

18. The combination of claim 1, said last mentioned means being adjacent an end of the workman's platform.

19. The combination of claim 18, said workman's platform being rectangular in platform, and said platform including extensions at the sides thereof, located at the said end of the platform.

20. A vehicle comprising a mobile chassis, a workman's platform, means supporting said workman's platform on said chassis for movement between a lower position adjacent the chassis and an upper position at a level above the chassis, first article engaging and lifting means on said chassis for engaging an article adjacent said vehicle at ground level and for depositing the article on the platform, in the lower position thereof, means on the platform for storing a plurality of articles, and, second engaging and lifting means on the platform for engaging an article thereon and for lifting the article to an elevation above said storing means.

21. The vehicle of claim 20, said means for supporting said platform comprising scissors linkage.

22. The vehicle of claim 20, said first mentioned article engaging and lifting means comprising lever means pivotally connected to said chassis at one end and having the other end substantially at the level of said storing means in the elevated position of said lever means.

23. The vehicle of claim 20, said platform having a floor, said storing means being above said floor.

24. The vehicle of claim 20, said last mentioned means comprising a substantially vertical hydraulic motor, said article engaging means being carried by said hydraulic motor, and movable thereby from a first position below said storing means to a second position above said storing means.

* * * * *